April 15, 1958 E. P. G. WRIGHT ET AL 2,831,150

ELECTRICAL INFORMATION STORAGE CIRCUITS

Filed Sept. 24, 1951 4 Sheets-Sheet 1

Inventor
E. P. G. WRIGHT - J. RICE - R. C. ORFORD
By Robert Harding Jr.
Attorney April 15, 1958 E. P. G. WRIGHT ET AL 2,831,150

ELECTRICAL INFORMATION STORAGE CIRCUITS

Filed Sept. 24, 1951 4 Sheets-Sheet 2

INVENTORS
E. P. G. WRIGHT
J. RICE and
R. C. ORFORD

BY Robert Harding Jr.
ATTORNEY

Inventor
E. P. G. WRIGHT - J. RICE -
R. C. ORFORD
By [signature]
Attorney

ELECTRICAL INFORMATION STORAGE CIRCUITS

Inventor
E.P.G. WRIGHT-
J. RICE-R.G. ORFORD
By Robert Harding Jr.
Attorney

United States Patent Office 2,831,150

Patented Apr. 15, 1958

2,831,150

ELECTRICAL INFORMATION STORAGE CIRCUITS

Esmond Philip Goodwin Wright, Joseph Rice, and Roy Chalice Orford, London, England, assignors to International Standard Electric Corporation, New York, N. Y.

Application September 24, 1951, Serial No. 248,082

Claims priority, application Great Britain September 29, 1950

19 Claims. (Cl. 315—84.5)

This invention relates to electrical information storage circuits.

It is well-known in the telecommunication art to store information by means of relays, multi-position switches, discharge tube counting chains and like equivalents. By the operated or unoperated condition of relays or tubes and by the position occupied by the wipers of multi-position switches received information is retained. It is common to scan the condition of the storage devices in turn so that the information may be extracted. For instance a stepping switch may have each of its fixed contacts connectable over a storage relay front contact to battery. When the switch wiper steps on to a contact associated with an operated relay, battery can be applied to an outlet over the wiper arm.

Information may be stored in numerical or non-numerical code form and storage or binary notation is becoming increasingly popular for example, in electronic computers.

One major line of development in this art is to store binary numbers in chains of interconnected gas discharge tubes in the form of patterns of operated and unoperated tubes. In one recently described arrangement, a pattern is continuously circulated in one direction around a ring of gas discharge tubes, an output being taken from one of the tubes when required.

In another recent arrangement, a storage circuit consists of a number of interconnected magnetic cores which can easily be switched from one to the other of two stable saturated flux conditions. With the latter circuit also, a binary pattern may be stored and moved in one direction along the circuit, one flux condition representing the binary digit 1 and the other the digit 0. A pulse pattern designating a binary number can be fed into one end of this magnetic storage circuit by means of stepping pulses applied to the cores and when required an identical pulse pattern can be extracted from the other end by a similar application of stepping pulses. A single-direction pattern circulation storage arrangement has also been described in which the pattern may be modified as it passes a particular point in the circulation, for instance, a stored number may be multiplied or divided and the product or quotient thereafter circulated.

It will be seen that it has so far been possible to move information along such counting chains in a single direction.

According to the present invention there is provided an electrical information storage circuit comprising a number of interconnected static electrical switches on which informations is stored in the form of operated and unoperated switches and means for progressing the pattern of operated and unoperated switches as a whole in each direction along the interconnected switches, and means for determining the direction in which movement is to take place.

The present invention also provides an electrical information storage circuit comprising a number of static electrical switches interconnected into a closed ring on which information is stored in the form of operated and unoperated switches and means for progressing the pattern of operated and unoperated switches as a whole in each direction around the ring and means for determining the direction in which movement is to take place.

A feature of the invention is an electric information storage circuit comprising a chain of interconnected gas-filled multi-gap glow discharge tubes each capable of storing an item of information in the form of a single anode/cathode gap being fired, means for firing any selected one of the gaps in at least one of the tubes and means for replacing a selected discharge in one tube by a discharge across the corresponding gap in either of the next adjacent tubes.

A further feature of the invention is an electric information storage circuit comprising a chain of interconnected gas-filled glow discharge tubes each capable of storing an item of information by its fired or unfired condition, means for firing any selection of the tubes, means for transferring the discharging condition of a tube to each of the next adjacent tubes, and means for determining in which direction the transfer is to take place.

Another feature of the invention is an electric information storage circuit comprising a chain of interconnected magnetic trigger devices each capable of storing an item of information by its magnetic field condition being in one of two stable conditions, the initial field conditions of all the devices being the same, means for triggering any selection of such devices into a predetermined one of the said two conditions and means for transferring the said predetermined field condition of a trigger device to another trigger device either on one side or the other thereof.

Use is made of static electrical switches.

The term "static electrical switch" as used in this specification is meant to embrace devices such as thermistor trigger circuits, hot or cold cathode gas-filled discharge tubes, hard tube trigger circuits, transistors and magnetic trigger devices.

It is thought that the following is a generic definition of the term, but in any case this attempt at definition must not be interpreted to exclude any of the above specific examples.

A static electrical switch is a device having a permanently positioned electrical path the effective impedance of which may be made to assume two widely different values, the selection of the one or the other value being determined by the electric or magnetic field condition of a control element with two stable field conditions.

The invention will now be described with particular reference to three embodiments thereof shown in the accompanying drawings in which.

Figure 3:
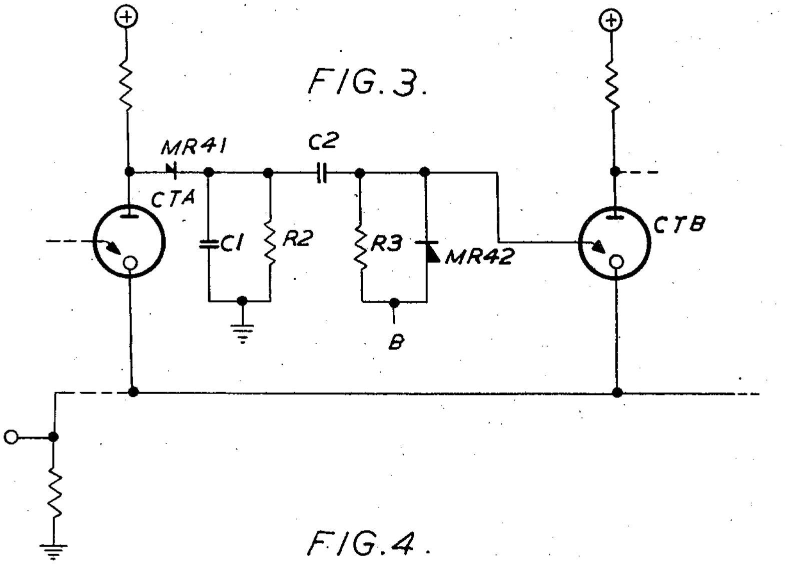
Fig. 3 is a diagram of part of a gas-filled discharge tube circuit by means of which a binary number may be stored and moved in one direction along a gas-filled discharge tube chain; this circuit is shown as an introduction to Fig. 5.
Figure 5:
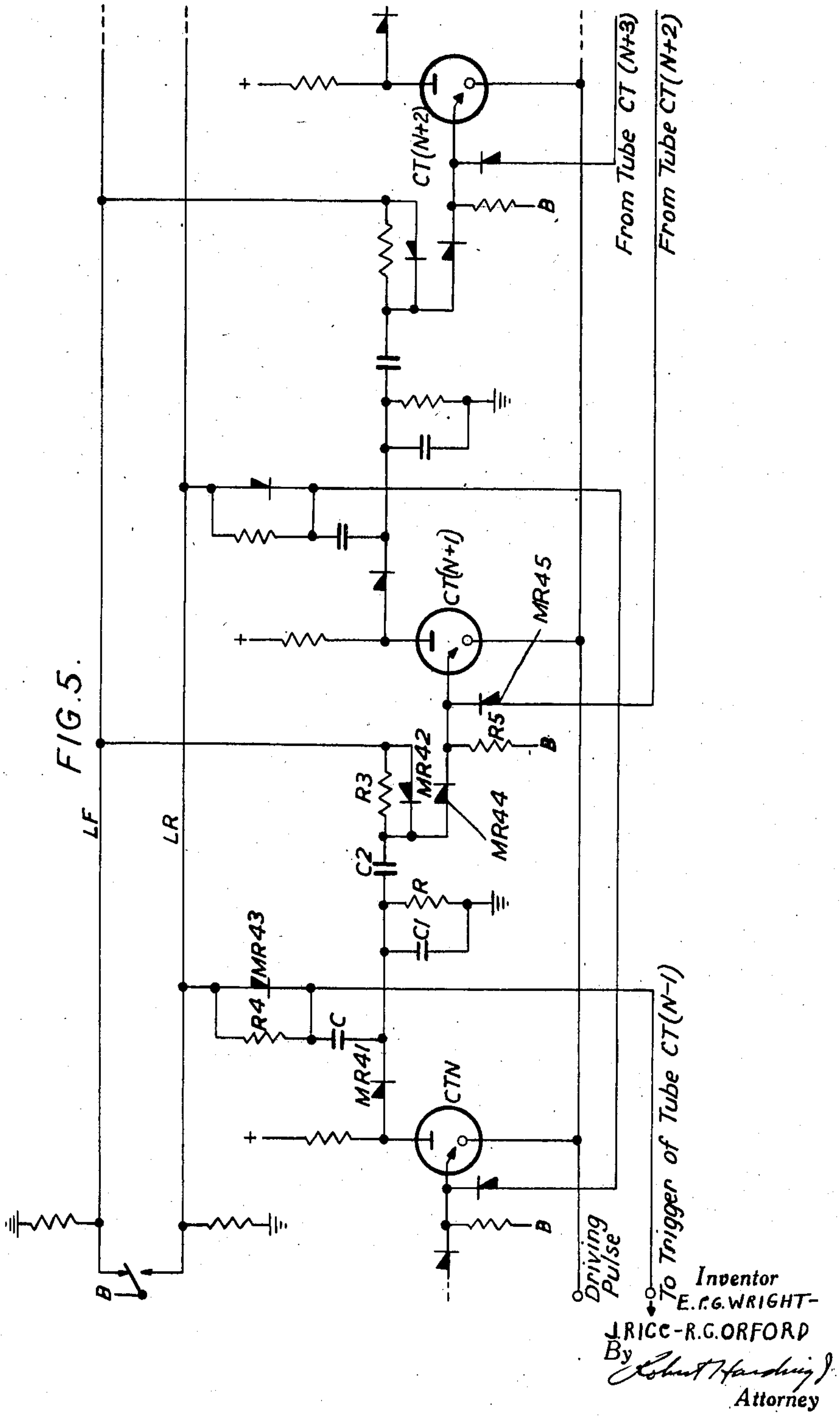

Fig. 5 provides a modification, according to the invention of the Fig. 3 circuit by means of which a stored binary number may be progressed in either direction along the tube chain.

Figure 7:
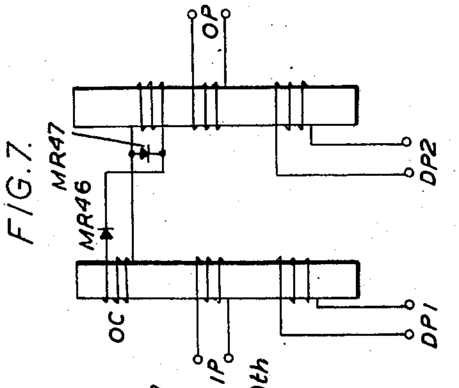
Figure 8:
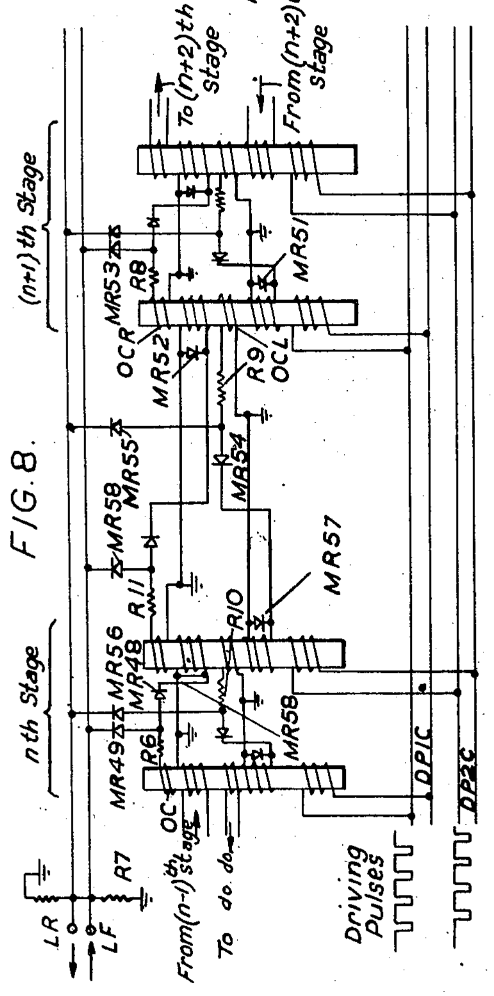
Figure 6:
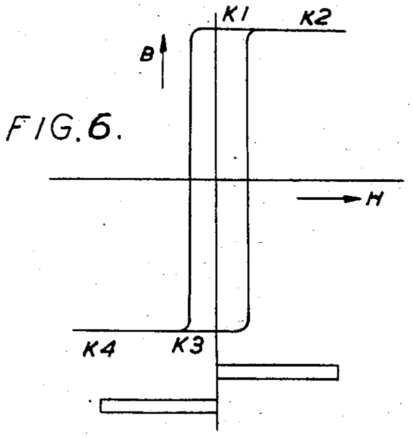

Figs. 6 and 7 are used to describe the operation of magnetic trigger devices which are employed in the binary digit storage circuit of Fig. 8. Fig. 6 shows the desired form of hysteresis loop for the magnetic cores employed and Fig. 7 shows a magnetic element for storage of a single binary digit.

Fig. 8 shows a two digit section of a binary digit storage circuit in which the digits may be progressed in either direction along the storage circuit.

The three embodiments of the invention are all concerned with the electrical storage of information on a number of interconnected static electrical switches. In the first embodiment, Figs. 1 and 2, gas-filled multi-gap cold cathode glow discharge tubes, are mainly employed although three electrode gas-filled discharge tubes are also used in an ancillary manner. The information is registered in decimal notation on the multi-gap tubes each which can be regarded as a group of interconnected static electrical switches within a single envelope. Operated (i. e. discharging) and unoperated (i. e. unfired) gaps record the information by their condition. Stepping pulses are applied to the storage arrangement and result in the decimal number being progressed, one unit storage space at a time. By applying a potential to one or other of two terminals the number can be progressed in either direction at will along the interconnected multi-gap tubes, which provide a circulating storage arrangement with a reversal feature. Also a decimal number can be multiplied or divided by ten and multiples thereof by movement of the stored number the appropriate number of digit spaces to the left or right respectively.

In the second embodiment, the form of static electrical switch employed is the three-electrode gas-filled cold cathode glow discharge tube. A number of these together with associated components, such as resistors and capacitors, are connected together to form a tube chain on which binary-coded information may be stored, again by the operated and unoperated (i. e. fired and unfired) condition of the tubes. Such information may conveniently be received in binary notation, marks being registered as operated tubes and spaces as unoperated tubes, or vice versa, so that the pattern of operated and unoperated tubes represents the stored information. The pattern may be progressed in either direction at will along the tube chain and the chain may be formed into a ring so that stored information can be continuously circulated.

Magnetic trigger devices with two stable magnetic field conditions are the static electrical switches used for the third embodiment. The operation is comparable with the operation of the second embodiment, information being stored by the magnetic field conditions on a binary basis. One of the field conditions is known as the operated and the other as the unoperated condition. In both the second and third embodiments, as in the first, the choice of direction of movement is dependent upon which of two terminals a potential is applied.

Figure 1:
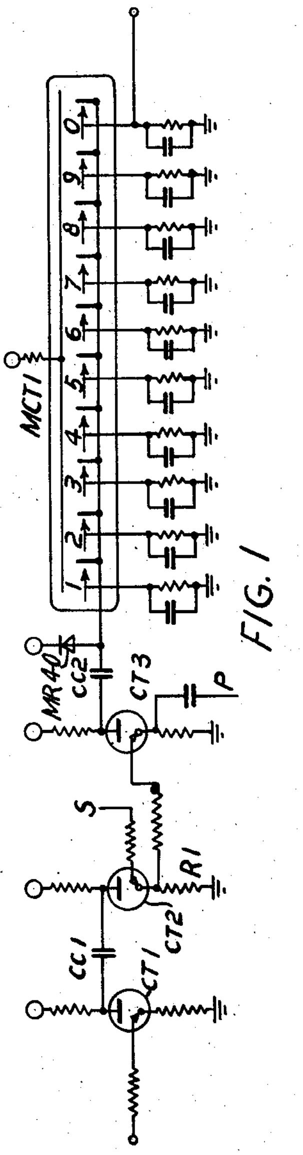
Fig. 1 shows an important element of a gas-filled discharge tube circuit in which a decimal number may be stored and progressed in either of two directions.

Turning now to Fig. 1, the operation of the circuit which forms the fundamental basis of the first embodiment of the invention, Fig. 2, will be described.

The circuit of Fig. 1 consists essentially of a flip-flop tube pair CT1 and CT2, a gating tube CT3 and a multi-gap sequence discharge tube MCT1. All these tubes are of the gas-filled cold cathode glow discharge variety. When the standing potentials are initially applied to the tubes, arrangements are made for CT1 to be fired and for the anode/cathode gap numbered 0 of the multi-gap tube to be in discharge. Such results can be obtained by temporarily lowering the cathode potential in each case so that the main gap potential difference becomes greater than the breakdown value. The discharge, once started, is maintained by the standing potential.

In operation, the circuit is required to count the negative-going pulses received at the point P and fed to the cathode of tube CT3. The counting is performed by the discharge in the multi-gap tube MCT1 stepping once for each pulse received, from the 0 to the 1 main gap, from 1 to 2 and so on in a manner as has previously been described. In order to achieve this operation, the circuit has first to be transformed from an inactive to an operative state. Pulses applied at P when CT1 is conducting will have no effect on the multi-gap tube MCT1. A positive-going start pulse is therefore applied at point S, this causes a breakdown between the trigger electrode and cathode of CT2 which discharge spreads to the tube main gap and the tube conducts. The anode potential of CT2 falls and a negative-going impulse is transmitted by the coupling condenser CC1, to the anode of CT1 which is thereby extinguished. The start pulse has therefore resulted in CT2 being fired and CT1 being extinguished. With CT2 conducting the positive potential developed across its cathode resistance R1 is applied to the trigger electrode of tube CT3. If a negative pulse is now received at the cathode of CT3 from the point P, a breakdown potential difference is developed across the trigger electrode/cathode gap and the tube is fired. The standing potentials on this tube are arranged so that firing and extinction takes place with every pulse received from point P, which latter pulses can be supplied from a standard pulse generator. Negative-going pulses are developed across the anode resistance of CT3 and these are applied via a condenser CC2 and rectifier MR40 circuit to the common transfer electrode lead of the multi-gap tube MCT1. The condenser-rectifier circuit is a pulse-shaping network. These pulses which are synchronised with the pulses which are received at P, cause the discharge in tube MCT1 to step in time with the pulses received at P. A cycle of operation is completed for every ten pulses applied to the transfer electrode lead and the completion of each cycle may be signalled by an output taken from the cathode of the 0 gap. An output may also be taken if required, from any other cathode. The counting process may be stopped at any time by the cessation of supply of pulses to the point P or by the firing of the stop tube CT1, the subsequent extinction of CT2 in the latter case removing the trigger electrode bias from CT3 thus preventing it from firing and forwarding pulses to MCT1.

Although it has been mentioned above that the anode/cathode main gap 0 has been initially fired, any particular gap may be fired at will be ensuring that the anode/cathode potential difference is larger in that case than in any of the others.

Figure 2:
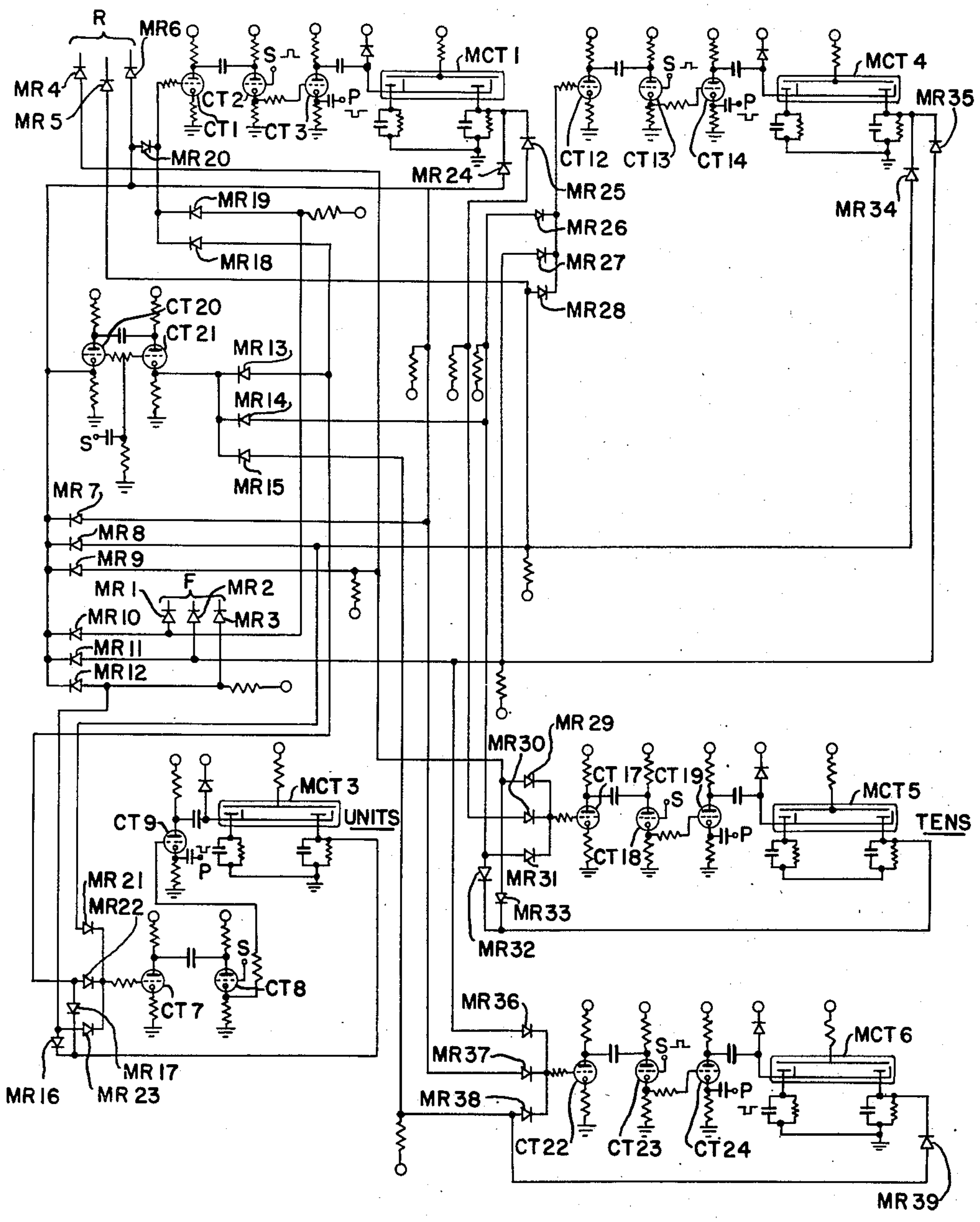
Fig. 2 is a schematic circuit diagram showing the complete decimal number storing circuit incorporating the invention, which circuit employs a number of the circuit elements shown in Fig. 1.

In Fig. 2 there is shown a circuit in which circuit elements identical to Fig. 1 have been utilized. There are shown in Fig. 2 four multi-gap tubes MCT1, MCT3, MCT4 and MCT6, each having a gated input circuit similar to the circuit shown in Fig. 1. Tube MCT3 has an input circuit which consists of flip-flop tube pair CT7, CT8, and gating tube CT9. Correspondingly, tube MCT4 has its flip-flop pair CT12, CT13 and gating tube CT14; tube MCT5 has its flip-flop pair CT17, CT18 and gating tube CT19; and tube MCT6 has its flip-flop pair CT22, CT23 and gating tube CT24. In this figure, the tube MCT3 is the input tube; its associated tubes CT8 and CT9 receiving the start pulses S and negative pulses P, respectively. In this showing the tube MCT3 is adapted to count units digits and the tube MCT5 tens digits.

The Fig. 2 circuit comprises a two-digit decimal storage with the facility for movement of these digits in either direction relative to an imaginary decimal point. In the detailed description to follow it will be shown how the stored digits can be moved a step at a time to the right and how the least significant digit can be made to appear at a receiving point.

Consider that tens and units digits are stored by particular gaps being fired in MCT3 and MCT5 respectively and that CT1, CT7, CT12, CT17 and CT20 are fired, the remainder of the three-electrode tubes being extinguished and the other multi-cathode tubes discharging across the 0 main gap. The required gap discharges in the multi-gap tubes are obtained by temporarily dropping the potential of the appropriate cathodes. A positive blocking potential is applied at point F and earth at point R.

Under these conditions, when pulse S is received, the tube CT20 which has previously been fired is extinguished. This is due to the firing of tube CT21 by the start pulse. With the tube CT21 fired, a positive potential is developed across its cathode resistance which potential blocks the rectifiers MR13, MR14 and MR15. The start pulse S also causes tubes CT2, CT8, CT13, CT18 and CT23 to strike in each case opening the respective multi-cathode tube gates. Negative-going pulses are now applied at all the points P of the circuit causing each of the multi-cathode tubes to step. When MCT3 arrives at its 0 position, rectifiers MR16 and MR17 are both biased positively. With MR13 and MR17 both blocked, a positive potential is applied over rectifiers MR18 and MR22 respectively to the trigger electrodes of tubes CT1 and CT7. These stop tubes, therefore, are both fired extinguishing CT2 and CT8, respectively. With CT2 and CT8 extinguished, the tube gates CT3 and CT9 are closed. Further pulses at the points P will not cause MCT1 and MCT3 to take any further steps. During the time that MCT3 is stepping from its initial position to 0, MCT1 takes a number of steps equal to the complement to 10 of the initial position of MCT3, i. e. the complement of the units digit. In a similar manner, when MCT5 reaches cathode 0 the bias developed across that cathode is applied to block the rectifiers MR32 and MR33. With MR14 also blocked, a positive potential is applied over rectifiers MR26 and MR31, respectively, to the trigger electrodes of tubes CT12 and CT17 causing these tubes to fire, so extinguishing tubes CT13 and CT18 respectively. Tube gates CT14 and CT19 are thereby closed and multi-cathode tubes MCT4 and MCT5 take no further steps. MCT4 will be left recording the complement of the tens digit initially found on tube MCT5. Tube MCT6 during this time makes a complete cycle. When it reaches the 0 cathode it applies a potential to block rectifier MR39 and, with MR15 blocked, a positive potential is applied over rectifier MR38 to the trigger electrode of tube CT22 which fires, extinguishing CT23, closing the tube gate CT24 and stopping the multi-cathode tube MCT6. A further start pulse S is now applied to all the points S of the circuit which refires tube CT20 extinguishing CT21 and also refires the start tubes, such as CT2, of all the multi-cathode tubes. Now pulses at point P step the multi-cathode tubes as before. Tube MCT1 steps its discharging condition to the 0 cathode once more. When this is reached a positive potential is applied to block both rectifiers MR24 and MR25. Rectifier MR10 is blocked by a positive potential developed across the cathode of tube CT20, rectifier MR3 is blocked by the positive potential applied to point F, and, therefore, a positive potential is applied over rectifiers MR19 and MR30 to tubes CT1 and CT17 respectively. These are the stop tubes of multi-cathode tubes MCT1 and MCT5 respectively, so that the latter tubes take no further steps. Tube MCT5 will be remembered to have started this particular movement when it was at the 0 position and it is therefore now at the position denoting the complement of the position of MCT1, or in other words, it is now recording the original units digit. The complement of what was first in MCT3 has been temporarily stored in MCT1 and the complement of the complement, that is the original number, has now been transferred to MCT5.

MCT4 at the beginning of this movement is recording the complement of the tens digit originally stored in MCT5, but when it steps and reaches 0, MR34 and MR35 are both blocked by a positive potential developed across the resistance in its 0 cathode circuit. MR11 and MR2 are blocked also so that a positive potential is applied over rectifiers MR27 and MR36, respectively to tubes CT12 and CT22. The firing of these tubes effects the stopping of any further stepping in tubes MCT4 and MCT6. In the same way as MCT5 is now recording the original units digit, MCT6 is now recording the original tens digit. Tube MCT3 makes a complete cycle and stops itself at the 0 cathode, because with MR16 and MR12 blocked the positive potential is fed over rectifier MR23 to the stop tube CT7.

It will be clear that the digits have moved along one space, the units digit is now stored in the tube which originally stored the tens digit, and the tens digit is to be found in tube MCT6. This action could be repeated, the original tens digit being passed to other tubes not shown. It will now be described how the original units digit will in turn be passed to the multi-cathode tube MCT6.

A further S pulse causes CT21 to strike once more, extinguishing CT20 and all the start tubes are re-fired. Once more the multi-cathode tubes step their discharging condition under control of the negative pulses applied to their respective gating tubes. As before, multi-cathode tube MCT3 performs a complete cycle and stops. At the same time the tube MCT5 steps its discharging position until it reaches the 0 cathode position where it produces a blocking potential for rectifier MR32, MR14 is blocked because CT21 is now operated and therefore, a positive potential is applied over rectifiers MR26 and MR31 respectively, to tubes CT12 and CT17, which fire. These stop any further movement of the discharging position in tubes MCT4 and MCT5. MCT4 is therefore, now recording the complement to ten of the original units digit which has been received by transfer from MCT5. During the time that MCT4 and MCT5 have been stepping, MCT6 steps from the tens digit position to 0. Here a blocking potential is developed for rectifier MR39 and because MR15 is blocked by CT21 being fired, a positive potential is applied over rectifier MR38 to tube CT22 which stops any further movement of the discharging position in tube MCT6. In a similar manner to that already described for the transfer of the tens digits to the tube MTC6, the next S pulse causes the complement of the number in MCT4 to be transferred to MCT6. Thus, the units digit is referred to tube MCT6. It will be seen that as the units and tens digits clear from the multi-cathode tubes, these tubes make complete cycles stopping each time at the 0 position.

In the operation described above, the tens digit has been transferred first to the tube MCT6. By applying a blocking potential to the point R instead of to the point F, the reverse operation can be made to take place. It should be clear that whichever of the points F and R does not have a blocking potential applied thereto, an earth is applied to it. With R at a positive potential and F at earth, instead of the number in MCT5 being transferred to MCT6 via MCT4, it is transferred via MCT4, MCT3 and MCT1. Also the number in MCT3, that is the units digit, which formerly pass to MCT6 via MCT1, MCT5, and MCT4, in that order, now transfers via MCT1 only.

The description above shows how a decimal number having two digits can be caused to progress along a storage circuit in either direction. It has been indicated that this circuit could be extended so that decimal numbers having a number of digits could be made to do the same thing. The tube MCT6 may be considered as a reviewing point past which the digits of the decimal number are taken in turn. Leads might be taken from the cathode MCT6 so that the number stored could be scanned, digit by digit, as it passes the tube MCT6.

Attention will now be turned to the storage of information in binary code form. A known form of gas discharge tube counting chain shown in Fig. 3 in which the pattern of discharging and non-discharging tubes can be progressed in one direction along the chain will now be described. It is also known that such a pattern may represent a binary number or other information in binary code form.

Figure 4:
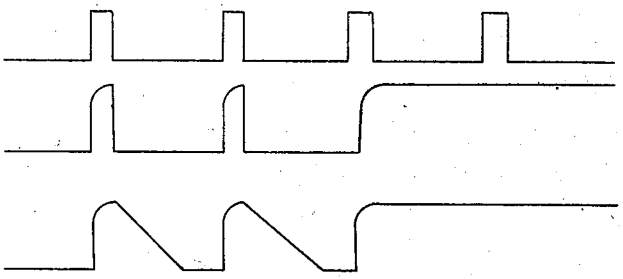
Fig. 4 shows waveforms encountered at points of the Fig. 3 circuit during its operation.

Consider that the pattern stored on the tubes of the chain at some particular time includes CTA being fired and CTB being extinguished. A positive-going driving pulse is applied to all the tubes of the chain in common. This pulse extinguishes the discharge in CTA. The rising anode potential charges the condenser C1 and at the same time applies a pulse to the next tube CTB through C2. This tube consequently fires when its normal cathode potential is re-applied on the trailing edge of the driving pulse. The charge on condenser C1 blocks rectifier MR41 in the event of tube CTA re-firing in conformation with the pattern movement and isolates the trigger electrode of CTB from any ill-effects due to a fall in potential on the anode of CTA. If CTA triggers, C1 discharges through R2 during the pulse interval until it is caught at the anode potential of CTA. A rectifier-resistance circuit MR42—R3 is included between the source of biasing potential B and the trigger electrode of tube CTB. This gives a D. C. restoring provision for condenser C2, preventing the trigger electrode potential falling below B. The waveforms of the driving pulses in relation to the anode potentials of CTA and the condenser C1 potentials are shown in Fig. 4. From the latter figure it will be seen that when the first, second and third driving pulses are received, the anode potential is raised. This indicates that in each case CTA had previously been conducting. At the end of the third driving pulse however CTA anode potential remains at the positive H. T. potential. This is due to the fact that when the pattern being considered is moved to the right three steps, CTA records an element of information opposite in sign to those previously recorded. With the operation of this Fig. 3 circuit in mind, attention should be turned to the second embodiment of the invention to which Fig. 5 refers.

In the circuit of Fig. 5 information is again stored in binary code form but this time the pattern of operated and non-operated tubes can be moved in either direction. The initial storage of the information can be achieved either by temporarily lowering the potential of the cathodes of the appropriate tubes or by progressing the storage pattern into the chain from one end as has been previously described. The direction of movement is determined by the application of biassing potential B to one of two leads LF and LR. This choice of application is shown diagrammatically in the figure by a movable relay contact over which the bias potential B is fed to either of the leads LF or LR. The individual tubes of the gas tube chain are shown as tubes CTN, CT($N$+1), CT($N$+2). On these, binary elements of the stored information are recorded by their operated or unoperated condition. Components comparable with those indicated in Fig. 3 are given the same references.

Assume that the stored pattern at some particular moment includes CTN and CT($N$+1) tubes both operated, CT($N$—1) (not shown) and CT($N$+2) being extinguished. Assume also that the bias battery B is connected to the LF lead. As before, driving pulses are supplied over a lead common to the cathodes of all the tubes.

On receipt of the first of the driving pulses after the moment considered, both CTN and CT($N$+1) tubes will be extinguished. Condenser C1 is charged up and a pulse is passed forward over condenser C2. Because of the bias B applied over R3 and MR42 the right-hand side of the condenser C2 has been standing at a potential B. Hence when the pulse is supplied thereto, a potential considerably greater than B is to be found at the C2 side of rectifier MR44. This rectifier has only a potential B (applied over resistance R5) on its other side and it therefore conducts in the forward direction. The trigger electrode of tube CT($N$+1) has a triggering potential applied to it so that it re-fires upon the end of the first driving pulse. In this way the condition which had been recorded by the CTN tube has been passed forward to the CT($N$+1) tube.

The pulse developed by the extinction of tube CTN and the consequent charging and discharging of condenser C1 is passed forward via condenser C2 to effect the re-firing of tube CT($N$+1) but the pulse passed forward over condenser C3 does not effect the firing of tube CT($N$—1). The reason for this will now be explained. Because the battery B is connected to the lead LF, the lead LR is at earth potential. Hence the plate of condenser C3 on the side away from the anode connections of tube CTN stands at earth potential. A pulse passed by the condenser C3 is presented to a rectifier corresponding to rectifier MR45, at the CT($N$—1) tube, but at a low level. As this rectifier has a potential B standing on its farther side it will not conduct so that in consequence, tube CT($N$—1) will not be fired.

Initially, tubes CTN and CT($N$+1) were fired so that the receipt of one driving pulse will result in tubes CT($N$+1) and CT($N$+2) being fired instead. If the potential condition of the bias leads LF and LR had been reversed, it is clear that the movement of the pattern would have been in the opposite direction, one driving pulse then resulting in tubes CT($N$—1) and CTN being fired.

In this manner, a pattern may be moved in either direction along a tube chain at high speed by the application of driving pulses to the tube cathodes, coupled with a positive bias potential being applied to one of two common leads, the other being at earth potential. One of the tubes may be considered as a reviewing tube, the pattern being scanned as it passes that point. The stored information may be extracted by a lead taken from the cathode of the reviewing tube via suitable decoupling means.

In the third embodiment of the invention use has been made of a magnetic form of static electrical switch instead of the gas-filled glow discharge tube form employed in the earlier embodiments. To appreciate the operation of this magnetic static electrical switch Figs. 6 and 7 have been included. The switch requires a core having a substantially square loop hysteresis characteristic as shown in the curve in Fig. 6. This material when saturated in either direction retains its remanent magnetism at a flux density practically the same as the saturation flux for an extremely long duration.

Consider now a closed magnetic core of thin section (to reduce hysteresis losses) on which are wound three coils. The left-hand portion of Fig. 7 may be referred to. There the core has been shown in a rectangular formation but that convention is simply for ease of drawing. Imagine first a magnetising pulse being fed via the inlet IP (Fig. 7), this pulse being of such polarity and amplitude that the core is positively saturated. On the removal of the pulse, the core condition will return to the point K1 (Fig. 6). If now a further similar pulse is fed to the inlet DP1 (Fig. 7), the core flux will make an excursion from K1 to K2 and back again (Fig. 6). In the ideal situation there will be no flux change in the core and in practice the linkage with a third coil on the core will be negligible. If however, the initial pulse applied to the IP inlet is of the opposite polarity, then the receipt of the DP1 inlet pulse will cause the core flux condition to make an excursion from K3 to K2 returning to its remanent position at K1. Hence there has been a large change of flux from one stable condition to another and the linkage with a third coil will be considerable. Hence the polarity of the pulse initially applied can be detected by the presence or absence of an output pulse from the third coil providing the polarity of the pulse applied to the DP1 inlet is known.

It will be appreciated that this device may be used as the basic element of a pattern movement chain. If the polarity of the pulse initially applied to the core is such that, with a predetermined polarity of pulse applied to the core by the DP1 inlet, an output pulse is obtained, we may conveneintly say that the information stored in the core by its initial remanent condition is the binary digit 1. An initial pulse of the opposite polarity will then be the binary digit 0. If now the output pulse from that core is fed to a coil mounted on a second core so that there is induced in the latter a remanent flux condition of polarity indicating the storage of the binary digit 1, the digit originally stored in the first core may be said to be passed to the second core. This arrangement is shown in Fig. 7, the output coil OC of the first core being connected to the input coil of the second. Whatever flux condition the first core was in after the initial pulse had been received from inlet IP, the application of a pulse to inlet DP1 leaves the core always in the same remanent condition. This is such that for a binary digit 0, the core condition remains the same. If now a pulse of polarity representing the binary digit 1 is received via IP, a change of flux occurs once more and the coil OC is linked. The direction of change however is in the opposite direction from that previously described, it is from K1 to K4 and back to K3 (Fig. 6). The direction of the current induced in the coil OC is in the opposite direction also and because of the rectifier MR46 no output pulse is passed forward. Hence it is only in response to the receipt of an appropriate driving pulse at the inlet DP1 that a binary digit 1 can be forwarded.

With the binary digit 1 forwarded to and stored on the second core, a driving pulse is in turn applied to the inlet DP2. A considerable flux change takes place and an output pulse is received at the terminals OP. No backward current affects the first core because the only coil connected thereto is short circuited for these induced currents by the rectifier MR47.

A number of cores, pairs of which are connected as shown in Fig. 7, may be connected together. With pulses representative of information in binary code form fed into the inlet of the first core and driving pulses applied in turn to two leads commoned to alternate core driving inlets a pattern of core flux conditions, representing a binary number, may be passed along the interconnected cores. Such an arrangement has already been described. Alternatively the information could be initially stored by having an additional coil on alternate cores by means of which those cores are preset into appropriate conditions representative of the information.

In the third embodiment of the invention shown in Fig. 8, magnetic trigger devices of the kind described above and shown in Fig. 7 are the static electrical switches employed. A pair of cores is provided for each stage of a pattern movement chain. The $n$th and the $(n+1)$th stages are shown in Fig. 8. Once again the movement is arranged to be in either direction along the chain according to which of two leads LF and LR has applied thereto a blocking potential. The two trains of driving pulses required are applied to the cores via the channels DP1C and DP2C. The driving pulse trains are of the same frequency but 180° out of phase for steady progression of the pattern.

Consider first the $n$th stage. Any pulse passed forward from the $(n-1)$th stage is received by the appropriate coil and the information represented thereby is re-stored in the core. A driving pulse received over the DP1C channel causes an output pulse to be developed across the output coil OC when a binary digit 1 has been stored in the coil. As before this pulse is fed over rectifier MR48 to the inlet coil of the second core of the same stage. In this case, however, the information can only be passed forward if a blocking potential has been placed on the LF lead. This is because the blocking potential prevents current passing to earth over R6, MR49 and R7. Resistance R6 is large compared with the forward resistance of MR49 and with R7 so that when this path is free, i. e. there is no blocking potential on LF lead, the greatest potential drop is in R6. Hence no appreciable pulse can be passed forward over MR48. This rectifier gating circuit is known. The rectifier MR50 corresponds to MR47 in Fig. 7.

It will be apparent from the drawing that the connections for the forward movement of the pattern shown in Fig. 7 are duplicated in Fig. 8 to permit of the reverse movement also. A blocking potential on lead LF but not on LR permits forward movement of the pattern only. With the conditions of these two leads reversed retrogression of the binary pattern is obtained.

Consider the binary pattern 1010 stored on the magnetic trigger stages $(n-2)$ to $(n+1)$ respectively i. e. in both of the $(n-2)$th and $n$th stages the left hand first core will be at the binary digit 1 representative flux condition, all the remainder of the cores in each stage being in the flux state corresponding to the binary digit 0. The lead LF has the blocking potential applied thereto.

When the first driving pulse is received over the DP1C channel the binary digit 1 on the left hand core of the $n$th stage is transferred to the right hand core leaving the left hand core in the 0 representing condition. Similar transfer from left to right core takes place in the $(n-2)$th stage. In the other stages the first driving pulse produces no result.

A driving pulse is next received over the DP2C channel. This has no effect except on the right hand cores of the $(n-2)$th and $n$th stages where it produces the transference of the binary digits 1 stored therein to the left hand cores of the $(n-1)$th and $(n+1)$th stages respectively. Hence the application of two driving pulses in turn over the two channels has resulted in the pattern 1010 being progressed to storage on the $(n+1)$th to $(n+2)$th stages.

Consider now the simple case of a binary digit 1 being stored by the remanent flux condition of the $(n+1)$th stage left hand core, which digit it is desired to transfer to the $n$th stage. The blocking potential condition is applied to the LR lead, the LF lead being left earthed through R7. A driving pulse applied over DP1C channel causes each of the other coils mounted on the core being considered to experience a considerable flux linkage. An output pulse can only be forwarded by one of these four coils however for reasons now to be explained. The rectifiers MR51 and MR52 are arranged to provide short circuit paths for currents induced in the coils across which they are connected. Hence these coils transmit no pulses. The coil OCR produces a pulse but this is dissipated by the dropping resistance R8 in the circuit through R8, rectifier MR53 in the forward direction, resistance R7 to ground. Hence no pulse is forwarded to the right hand core of the $(n+1)$th stage. Distinct from these three coils the coil OCL does produce an output pulse, which is forwarded over rectifier MR54 to the right hand core on the $n$th stage. This is because with rectifier MR55 blocked the rectifier-resistance gate MR55—R9 is open. Hence the digit 1 is transferred by a DP1C pulse from its original storage to the right hand core of the $n$th stage. Rectifier MR56 is blocked so that the R10—MR56 gate is open. Rectifiers MR50 and MR57 provide short circuit paths across their respective coils. Resistance R11 provides a dissipating resistance in the circuit through rectifier MR58 and resistance R7 to ground. In these circumstances the next stepping pulse received over the DP2C channel effects the transference of the binary digit 1 to the left hand core of the $n$th stage. In this way the retrogression of a pattern is obtained.

In this embodiment as in those previously described one stage may be considered as the reviewing stage and the pattern scanned as it is moved past that point.

In any of these embodiments the static electrical switches, or groups thereof, may be arranged in a ring so that continuous circulation of stored information is obtainable. A controlled number of driving pulses may be applied to the storage circuit so that the information can be moved a predetermined number of steps. Also with one stage being considered as a reviewing point the pattern may be modified as it moves past that point.

This invention enables numerical information to be multiplied or divided by the radix on which the storage is based or multiples thereof, by moving the pattern the appropriate number of places to the left or right respectively.

While the principles of the invention have been described above in connection with specific embodiments, and particular modifications thereof, it is to be clearly understood that this description is made only by way of example and not as a limitation on the scope of the invention.

What we claim is:

1. An electrical information storage circuit wherein the pattern of stored information will be progressed as a whole along a chain of interconnected storage devices comprising a plurality of two-condition static electrical switches, alternate of said switches constituting storage elements adapted by a first condition of operation to store information in a given radix, intervening of said switches intermediate said storage elements constituting repeating elements, each of said repeating elements adapted to assume a first condition of operation complementary to the first condition of operation of an adjacent storage element, means for altering the condition of operation of given of said storage elements in response to the application of additional information thereto, separate coupling means inter-coupling adjacent of said static switches, first transfer means for transferring the altered condition of a storage element to an adjacent repeating element, additional transfer means for transferring the altered condition of a repeating element to the next adjacent storage element and direction-determining means coupled to each of said coupling means for controlling the direction in which said transfers shall occur upon operation of respective of said transfer means.

2. An electrical information storage circuit as claimed in claim 1, wherein said switches are interconnected to form a closed ring.

3. A circuit as claimed in claim 1 in which one of the said interconnected static electrical switches is arranged to be a reveiwing point, and which comprises means for scanning the stored information as it is progressed in either direction past the said point.

4. A circuit as claimed in claim 3 in which means are provided for modifying the stored information as it is progressed past the said reviewing point.

5. A circuit as claimed in claim 3 further comprising means for transmitting the said stored information as an impulse train wherein the spacing between impulses varies and is dependent upon the said pattern of operated and unoperated switches.

6. A circuit as claimed in claim 3 in which the switches are arranged to store information on the basis of radix two, whereby information in binary notation may be stored.

7. A circuit as claimed in claim 3 in which the switches are arranged to store information on the basis of radix ten, whereby numerical information in decimal notation may be stored.

8. A circuit as claimed in claim 3 wherein said static electrical switches are gas-filled glow discharge tube trigger circuits.

9. A circuit as claimed in claim 3 wherein said static electrical switches are magnetic trigger circuits.

10. A circuit as claimed in claim 3 in which the pattern progression is obtained in either direction in step by step movement under control of the application of driving pulses to the circuit applied by respective of said transfer means.

11. An electrical information storage circuit as claimed in claim 2, wherein each of said repeating elements comprises a pair of terminals and said direction-determining means comprises a source of potential and a switch, said switch adapted to selectively apply said potential to corresponding terminals of said pairs, the direction of progression along said switches being determined by the application of said potential to different corresponding terminals of said pairs, a potential difference in one direction between corresponding first terminals of said pairs permitting progression in one direction only and a potential difference in the other direction between corresponding second terminals of said pairs permitting progression in the other direction only.

12. An electric information storage circuit as claimed in claim 1, wherein said static electric switches comprise a chain of interconnected gas-filled multi-gap glow discharge tubes each capable of storing an item of information in the form of a single anode/cathode gap being fired, under control of said altering means, said repeating elements adapted to repeat in a corresponding gap in a tube a discharge of a selected gap in either of the next adjacent tubes.

13. A circuit as claimed in claim 12 in which the replacing means comprises a further chain of interconnected gas-filled multi-gap glow discharge tubes an intermediate step in the said replacement being the effecting of a discharge across a gap in a tube of the said further chain which is complementary to the said selected discharge in the said one tube.

14. A circuit as claimed in claim 11, wherein said switches comprise a chain of interconnected gas-filled glow discharge tubes and wherein said repeating elements further comprises a plurality of pairs of gating networks, each connected to one of said terminals one pair associated with each of the tubes of said chain, the first network of each pair coupled between given tubes of said chain and the tube adjacent thereto on one side thereof and the other network of each pair coupled between said given tubes and the tube adjacent thereto on the opposite side thereof, corresponding networks adapted to be gated open in response to the application of said potential to its associated terminal.

15. A circuit as claimed in claim 14, wherein said altering means comprises a source of pulses, said source coupled to each tube in said chain and adapted to have its output applied simultaneously to each of said tubes.

16. A circuit as claimed in claim 14 in which a selection of tubes is fired and in which the transference of each of the discharging conditions to the next adjacent tube, in the same direction, occurs simultaneously.

17. An electric information storage circuit as claimed in claim 1, wherein said switches comprise a chain of interconnected magnetic trigger devices each capable of storing an item of information by its magnetic field condition being in one of two stable conditions, the initial field conditions of all the devices being the same, said altering means adapted to trigger any selection of such devices into a predetermined one of the said two conditions said repeating elements adapted to repeat said predetermined field condition of a trigger device to another trigger device either on one side or the other thereof.

18. A circuit as claimed in claim 17 wherein said repeating elements comprise two sets of gating networks between adjacent trigger devices and wherein said direction-determining selection means controls the direction of transfer of the predetermined field condition, said last named means adapted for opening either all the gates of one set permitting the said transfer to take place in one direction or all the gates of the other set permitting the said transfer to take place in the opposite direction.

19. A circuit as claimed in claim 18 in which all the gates of either set are opened simultaneously.

(References on following page)

References Cited in the file of this patent

UNITED STATES PATENTS

| | | |
|---|---|---|
| 2,487,781 | Bascom | Nov. 15, 1949 |
| 2,519,513 | Thompson | Aug. 22, 1950 |
| 2,547,008 | Hough | Apr. 3, 1951 |
| 2,553,585 | Hough | May 22, 1951 |
| 2,575,516 | Hagan | Nov. 20, 1951 |
| 2,575,517 | Hagan | Nov. 20, 1951 |
| 2,583,102 | Holden | Jan. 22, 1952 |
| 2,584,811 | Phelps | Feb. 5, 1952 |
| 2,614,175 | Dimond | Oct. 14, 1952 |
| 2,649,502 | Odell | Aug. 18, 1953 |
| 2,666,575 | Edwards | Jan. 19, 1954 |
| 2,708,722 | An Wang | May 17, 1955 |
| 2,719,670 | Jacobs | Oct. 4, 1955 |

OTHER REFERENCES

Publication, Princeton, N. J. Institute for Advanced Study, 2nd Interim Prog. Report on the Physical Realization of an Electronic Computing Instrument, July 1947, pp. 30, 31, 31A, 32, 32A, 33, 34, 34A, 34B, 34C, 35, 35A, 36, 37, 37A.

Publication I, Journal of Applied Physics, January 1950, pp. 49–54.

Publication II, Magnetic Cores, Thesis by Munroe K. Haynes, pp. 33 to 35, 46 to 50, 57 and 58, Dec. 28, 1950.

Publication III, Electronics, January 1951, pp. 108 to 111.